US006269375B1

(12) United States Patent
Ruddy et al.

(10) Patent No.: US 6,269,375 B1
(45) Date of Patent: *Jul. 31, 2001

(54) REBALANCING PARTITIONED DATA

(75) Inventors: James Alan Ruddy, Gilroy; Bryan Frederick Smith, Morgan Hill, both of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,356

(22) Filed: Apr. 1, 1998

(51) Int. Cl.[7] .................................................... G06F 11/30
(52) U.S. Cl. ............................................................. 707/101
(58) Field of Search ................................. 707/101, 7, 2, 707/3, 8, 202

(56) References Cited

U.S. PATENT DOCUMENTS

| 4,575,798 | * | 3/1986 | Linstorm et al. ........................ 707/7 |
| 5,237,678 | | 8/1993 | Kuechler et al. ........................ 702/5 |
| 5,285,528 | | 2/1994 | Hart ..................................... 710/200 |
| 5,448,727 | | 9/1995 | Annevelink .......................... 709/101 |
| 5,457,797 | | 10/1995 | Butterworth et al. ............... 709/302 |
| 5,553,285 | | 9/1996 | Krakauer et al. .................... 707/202 |
| 5,555,404 | * | 9/1996 | Torbjornsen et al. ............... 707/202 |
| 5,625,811 | | 4/1997 | Bhide et al. ............................. 707/2 |
| 5,625,815 | * | 4/1997 | Maier et al. ............................. 707/8 |
| 5,710,915 | * | 1/1998 | McElhiney ............................. 707/3 |
| 5,761,652 | * | 6/1998 | Wu et al. ................................. 707/2 |
| 5,842,207 | * | 11/1998 | Fujiwara et al. ........................ 707/7 |
| 5,878,409 | * | 3/1999 | Baru et al. .............................. 707/2 |
| 5,960,431 | * | 9/1999 | Choy ....................................... 707/7 |

FOREIGN PATENT DOCUMENTS

| 2159269 | 3/1997 | (CA) .......................... G06F/15/167 |
| WO 97/04384 | 2/1997 | (WO) ............................. G06F/9/00 |

OTHER PUBLICATIONS

IBM Technical Disclosure Bulletin, vol. 38, No. 06, Jun. 1995, p. 557.
IBM Techincal Disclosure Bulletin, vol. 39, No. 01, Jan. 1996, pp. 65–68.
IBM Technical Disclosure Bulletin, vol. 40, No. 01, Jan. 1997, pp. 157–160.

\* cited by examiner

Primary Examiner—Hosain T. Alam
Assistant Examiner—Sanjiv Shah
(74) Attorney, Agent, or Firm—Sughrue, Mion, Zinn, Macpeak & Seas, PLLC

(57) ABSTRACT

A method, apparatus, and article of manufacture for a computer implemented rebalancing system. Partitioned data is rebalanced in a database stored on a data storage device connected to a computer. Range values are redefined for each partition. Next, the data is reordered into the redefined ranges for the partitions.

39 Claims, 6 Drawing Sheets

| Partition | 1 | 2 | 3 | 4 | 5 |
|---|---|---|---|---|---|
| Supplier Codes | | | | | |
| Hi-range: | 19999 | 39999 | 59999 | 79999 | 99999 |
| Lo-range: | 0 | 20000 | 40000 | 60000 | 80000 |
| Number of Records: | 500 | 500 | 500 | 500 | 500 |

FIG. 2

| Partition | 1 | 2 | 3 | 4 | 5 |
|---|---|---|---|---|---|
| |  |  |  |  |  |
| Hi-range:<br>Lo-range: | 19999<br>0 | 39999<br>20000 | 59999<br>40000 | 79999<br>60000 | 99999<br>80000 |
| Number of Records: | 500 | 500 | 1000 | 500 | 500 |

REBALANCING PARTITIONED DATA

CROSS-REFERENCE TO RELATED APPLICATION

This application is related to the following copending and commonly-assigned patent application:

Application Ser. No. 09/053,356, entitled "REPARTITIONING DATA," filed on same date herewith, by Daniel K. Courter, et al., which is incorporated by reference herein.

BACKGROUND OF THE INVENTION

1. Field of the Invention

This invention relates in general to computer-implemented database systems, and, in particular, to rebalancing partitioned data.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

A table can be divided into partitions, with each partition containing a portion of the table's data. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

Data may be distributed among partitions by a variety of schemes ("partitioning schemes"). One partitioning scheme assigns data to partitions according to a boundary value present in specified columns of the data row. The boundary value is the data value that separates each partition from the next partition. In one database system, the DB2® product offered by International Business Machines Corporation, Armonk, N.Y., a range of values is associated with each table partition by means of a CREATE INDEX statement. The CREATE INDEX statement gives the boundary value for each partition.

As records are added or removed from a partitioned table, the size of the partitions change. Over time, partitions can become unbalanced, with each partition containing widely different amounts of data. Parallel operations are less efficient when partitions are unevenly sized than when they are balanced in size. Moreover, sometimes a problem occurs with the size of the partitions because a database administrator who identified ranges for the partitions did not make an optimal selection, leaving the partitions unbalanced initially. The partitions could be rebalanced manually by a database administrator with a lot of effort, but this is time consuming and inefficient.

Additionally, rebalancing a subset of a table's partitions can result in all the table's partitions being unavailable to other applications. Finally, recovery of one or more partitions to a point in time prior to a manual rebalancing can result in data integrity problems.

Therefore, there is a need in the art for an improved method of rebalancing partitioned data.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented rebalancing system.

In accordance with the present invention, partitioned data is rebalanced in a database stored on a data storage device connected to a computer. First, range values are redefined for each partition. Next, the data is reordered into the redefined ranges for the partitions.

An object of the invention is to provide an automated technique for rebalancing partitioned data Another object of the invention is to rebalance partitioned data while compensating between partitions for excess records in one or more partitions.

BRIEF DESCRIPTION OF THE DRAWINGS

Referring now to the drawings in which like reference numbers represent corresponding parts throughout:

FIG. 2 illustrates a product table that has been partitioned based on supplier codes;

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
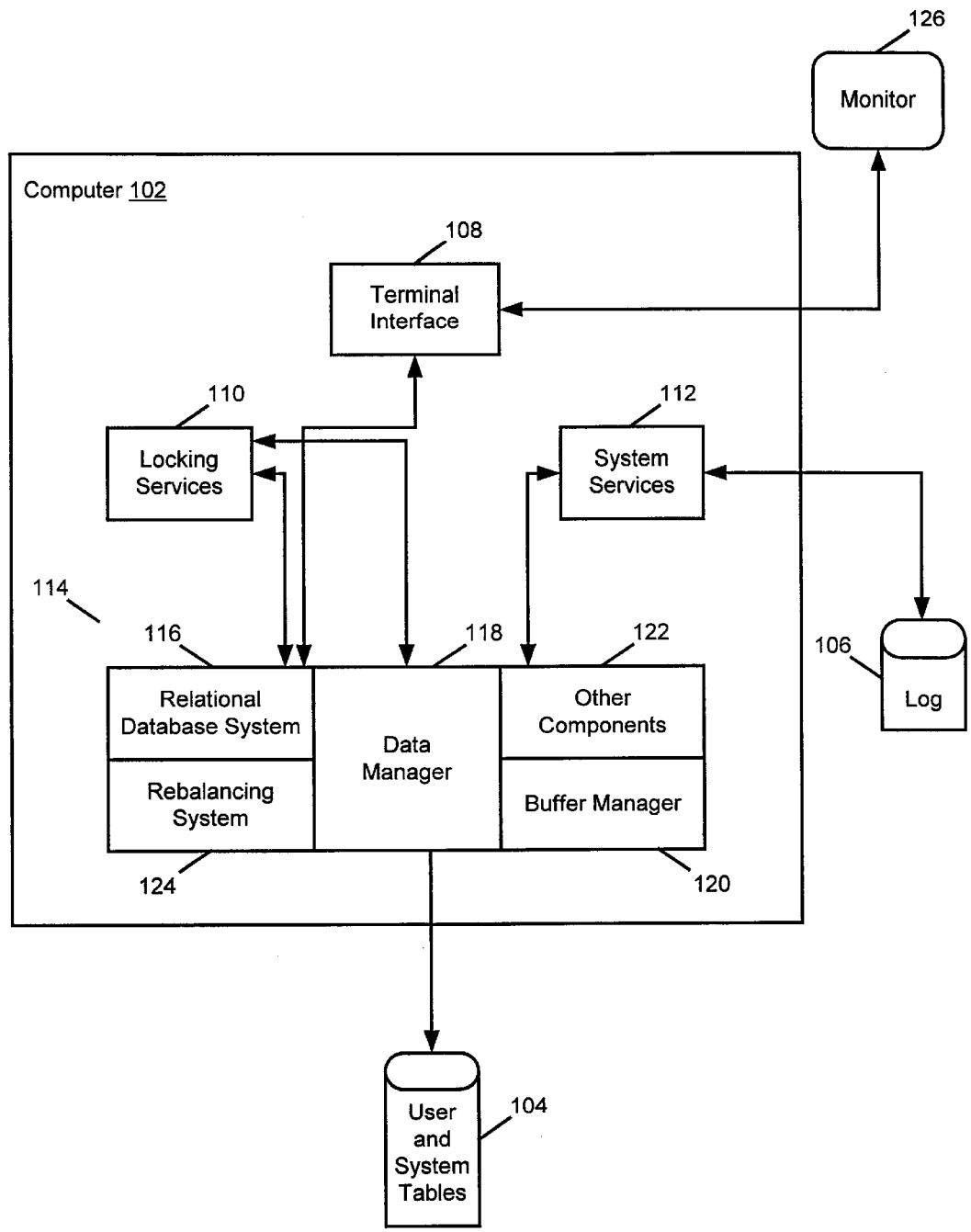
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the MVS® or OS/390® operating systems. Those skilled in the art will recognize, however, that the present invention has application program to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Rebalancing System 124, and other components 122 such as an SQL compiler/interpreter. These submodules support the functions of the SQL language, i.e. definition, access control, interpretation, compilation, database retrieval, and update of user and system data. The Rebalancing System 124 works in conjunction with the other submodules to rebalance partitioned data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Rebalancing Partitioned Data

The rebalancing system 124 of the present invention provides automated rebalancing of partitioned data. The balanced partitioned data lends itself to efficient parallel processing. Well balanced partitions enable the best possible elapsed time for parallel scans against the data. These scans could be anything from SQL queries to maintenance utilities (such as statistics gathering) running in parallel against each partition. The rebalancing system 124 obtains information on the partitions, including desired freespace, from a system catalog and takes this information into account when rebalancing partitioned data. Moreover, the rebalancing system 124 is able to balance partitions while compensating for partitions that are larger than an optimal size due, for example, to organization by non-unique keys.

One common method of partitioning database objects is by range value. These range values are selected/specified at table creation time. Each partition is usually a single file or dataset. The partitions may be stored on the same or separate data storage devices. FIG. 2 illustrates a product table that has been partitioned based on supplier codes. Partition 1 contains records whose key values correspond to range values 0–19999. Partition 2 contains records whose key values correspond to range values 20000–39999. Partition 3 contains records whose key values correspond to range values 40000–59999. Partition 4 contains records whose key values correspond to range values 60000–79999. Partition 5 contains records whose key values correspond to range values 80000–99999.

If parallel scans, or other operations, were performed on the partitioned, balanced data, the operations would complete at approximately the same time, providing efficient processing of the data in the multiple partitions. However, if the partitions are not initially balanced or if they become unbalanced after processing modifications to the data, such as adding records, the parallel operations would be as slow as the time to perform the operation on the largest partition.

Figure 3:
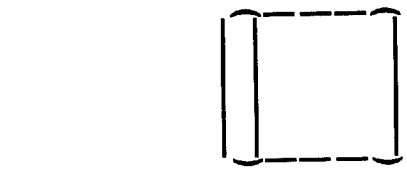
FIG. 3 illustrates a product table whose partitions have become unbalanced over time.
Figure 3:
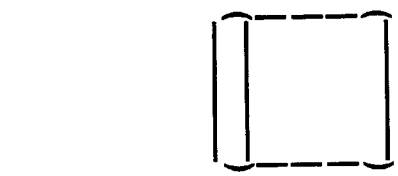
Figure 3:
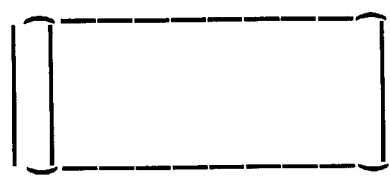
Figure 3:
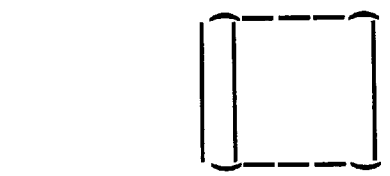
Figure 3:
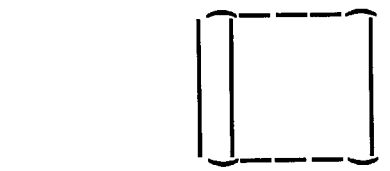

FIG. 3 illustrates a product table whose partitions have become unbalanced over time. The partitions are no longer balanced in terms of size, and partition 3 is larger than any of they other partitions. If parallel scans of these partitions are performed, the time to scan partition 3 may become the bottleneck, depending on the computer system's resources. In fact, the scan of this unbalanced table will be twice as long as the scan of the balanced table, because the scan of partition 3 will take twice as long as the scan of a balanced partition 3, as illustrated in FIG. 2, which in turn holds up the processing that takes place after the parallel processing, such as a scan. The scan can take different forms, such as being I/O bound or constrained. To get back optimal parallel scan performance, the rebalancing system 124 rebalances the partitioned data.

The rebalancing system 124 rebalances the partitioned data by redefining the range values in the data dictionary for the partitions and moving the data between the partitions.

The rebalancing system 124 provides a user interface (e.g., a graphical user interface) that enables a user to specify the following inputs:

Object to be rebalanced.

Number of partitions desired, with a default being no change in the number of partitions.

The rebalancing system 124 then rebalances the input object using the desired number of partitions to output a rebalanced object.

Figure 4:
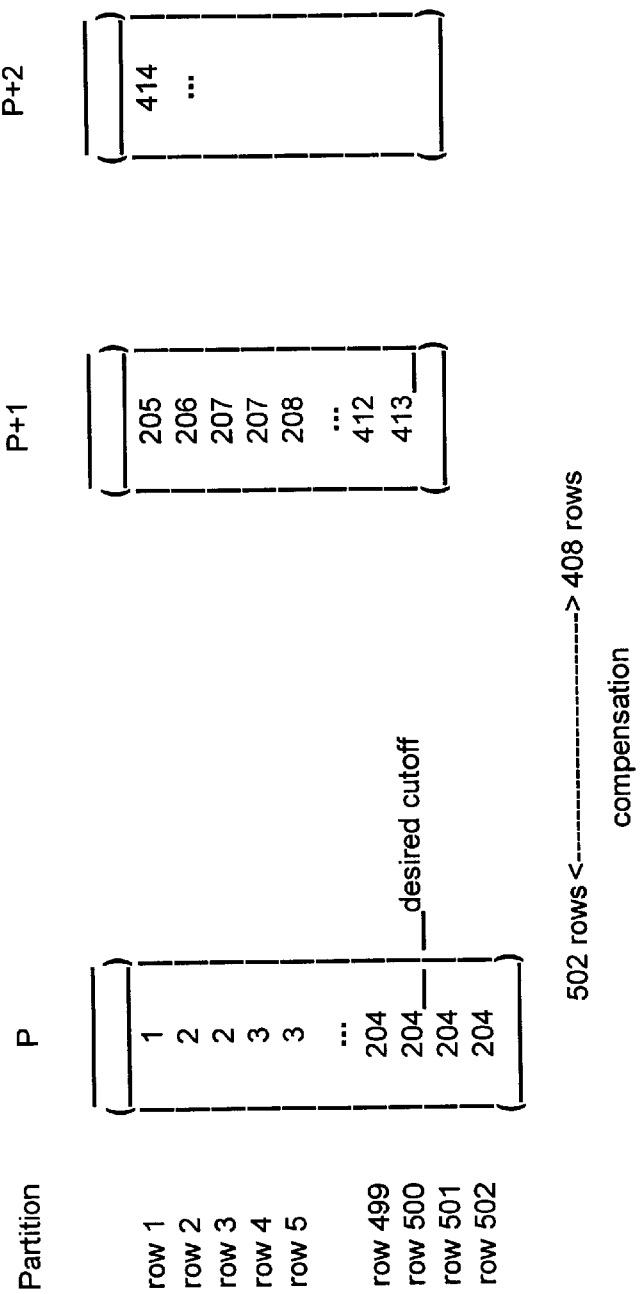
FIG. 4 illustrates partitions of a table that are being rebalanced.

FIG. 4 illustrates partitions of a table that are being rebalanced. The rebalancing system 124 first unloads all the data in the partitions. While unloading the data, the rebalancing system 124 maintains a count of the number of records (NR) unloaded. The rebalancing system performs the unloading by either using the clustering index or with a scan followed by a sort of the data on the range value, for example.

A range of values is associated with each table partition by means of a CREATE INDEX statement. A user creates an index for a partitioned table, called a partitioning index or clustering index. The index is based on one or more columns of the table and is used to define the scope of each partition and, thereby, assign rows of the table to their respective partitions. The following pseudocode represents SQL data definition language (DDL) for defining partitions:

| | | |
|---|---|---|
| CREATE INDEX | COLUMN <column ID>, | COLUMN <column ID> |
| | <PART <integer>> | <LIMIT KEY <key>>; |
| | <PART <integer>> | <LIMIT KEY <key>>; |

The COLUMN fields specify index columns, which are the partition values. The PART options specify limit keys (i.e., boundary values), using the LIMIT KEY options. The limit keys are the range values for the partitions and are stored in a system catalog. In standard SQL today, only a maximum range value is specified. In this embodiment, the limit keys may be in ascending or descending order, and all limit keys must be in the same order. Once the rebalancing system 124 completes its processing, the rebalancing system 124 updates the limit keys in the catalog to correlate to the new limit keys (i.e., ranges) defined by the rebalancing system 124.

The partitions are physically stored in a "file" or database. The partitions are stored with freespace (e.g., freepages), which is physical storage space in which data is not initially stored, so that additional data can be added to partitions. The rebalancing system 124 obtains information on the partitions, including desired freespace, from a system catalog and takes this information into account when rebalancing partitioned data. The following pseudocode represents SQL data definition language (DDL) for defining partitions with freepages and freespace:

| | |
|---|---|
| CREATE Index Column1, Column2 | |
| Partition1 | Limitkey1, freepage 10; |
| Partition2 | Limitkey2, freespace 50; |

The term "freepage 10" indicates that every tenth page of a partition is to be left free. The term "freespace 50" indicates that 50% percent (i.e., half) of each page should be left as freespace.

Next, the rebalancing system 124 determines an optimal maximum record number (MR) by dividing the number of records unloaded (NR) by the number of partitions (NP) (i.e., NR/NP), while compensating for desired freespace. The MR value reflects the number of records each partition should hold in order for the partitions to be equally balanced. In the example of FIG. 4, the MR value is 500. The rebalancing system 124 then redefines the number of partitions without the range values to the RDBMS.

Once this is completed, starting with the first partition, "p", the rebalancing system 124 reloads the data, maintaining a count of the number of records loaded (NL). Additionally, the rebalancing system 124 reloads the data based on the keys used to originally partition the data. When the number of records loaded, NL, into this partition equals the maximum record number, MR, the rebalancing system 124 continues to load records with the same range (i.e., key) value. The rebalancing system 124 does this in case duplicate key values exist. For example, in FIG. 4, the key value for record 500 is "204". Since the MR value is 500, once the rebalancing system 124 reaches record 500, the rebalancing system continues to load records with the same key value, such as records 501 and 502.

Once a new key value is seen, for example, "205", the rebalancing system 124 stops loading the current partition, "p". The rebalancing system 124 defines the range values to the RDBMS for this partition to be "1" to "204". Then, the rebalancing system 124 continues to load data into the next partition, "p+1". When duplicate range values are detected when the MR value is reached, the rebalancing system 124 keeps track of the number of records that are loaded into the partition and which exceed the MR value. The rebalancing system 124 compensates for this excess in the next sequential partition. For example, if partition "p" contains 502 records, rather than 500 records, the rebalancing system 124 attempts to place only 498 records into partition "p+1".

The rebalancing system 124 continues to load data into partitions until all of the unloaded data is reloaded. The result is rebalanced partitioned data.

Figure 5:
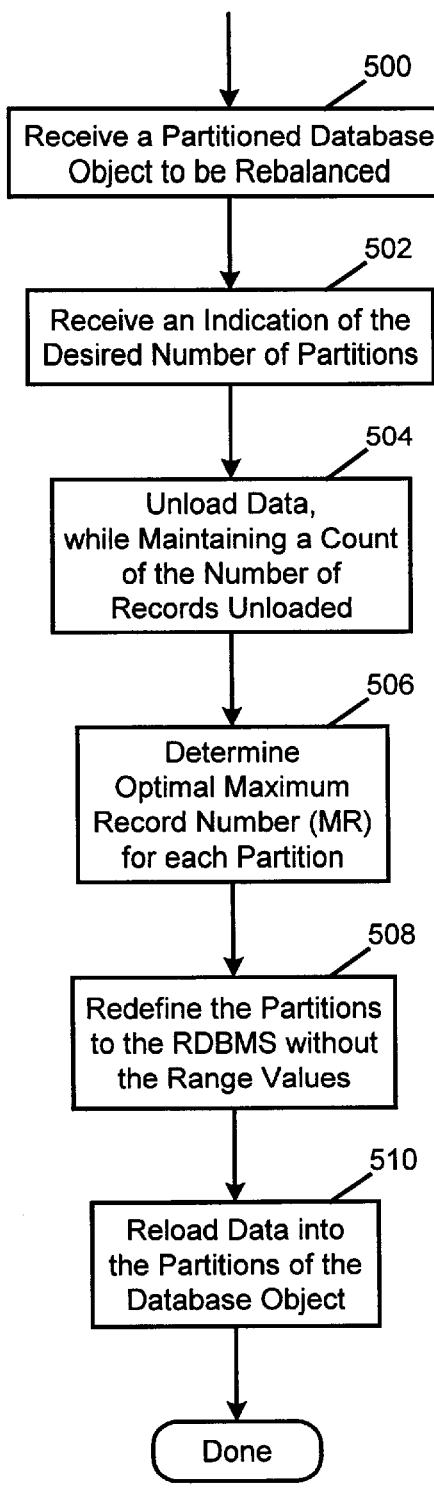
FIG. 5 is a flow diagram illustrating the steps performed by the rebalancing system to rebalance partitioned data.

In another embodiment, the rebalancing system 124 is further refined by looking ahead some number of records before the ML value is reached and using this to determine a more optimally balanced object FIG. 5 is a flow diagram illustrating the steps performed by the rebalancing system 124 to rebalance partitioned data. In Block 500, the rebalancing system 124 receives a partitioned database object to be rebalanced. In Block 502, the rebalancing system 124 receives an indication of the desired number of partitions. In Block 504, the rebalancing system 124 unloads data, while maintaining a count of the number of records unloaded. In Block 506, the rebalancing system 124 determines the optimal maximum record number (MR) for each partition. In Block 508, the rebalancing system 124 redefines the partitions to the RDBMS without the range values. In Block 508, the rebalancing system 124 reloads the data into the partitions of the database object.

Figure 6:
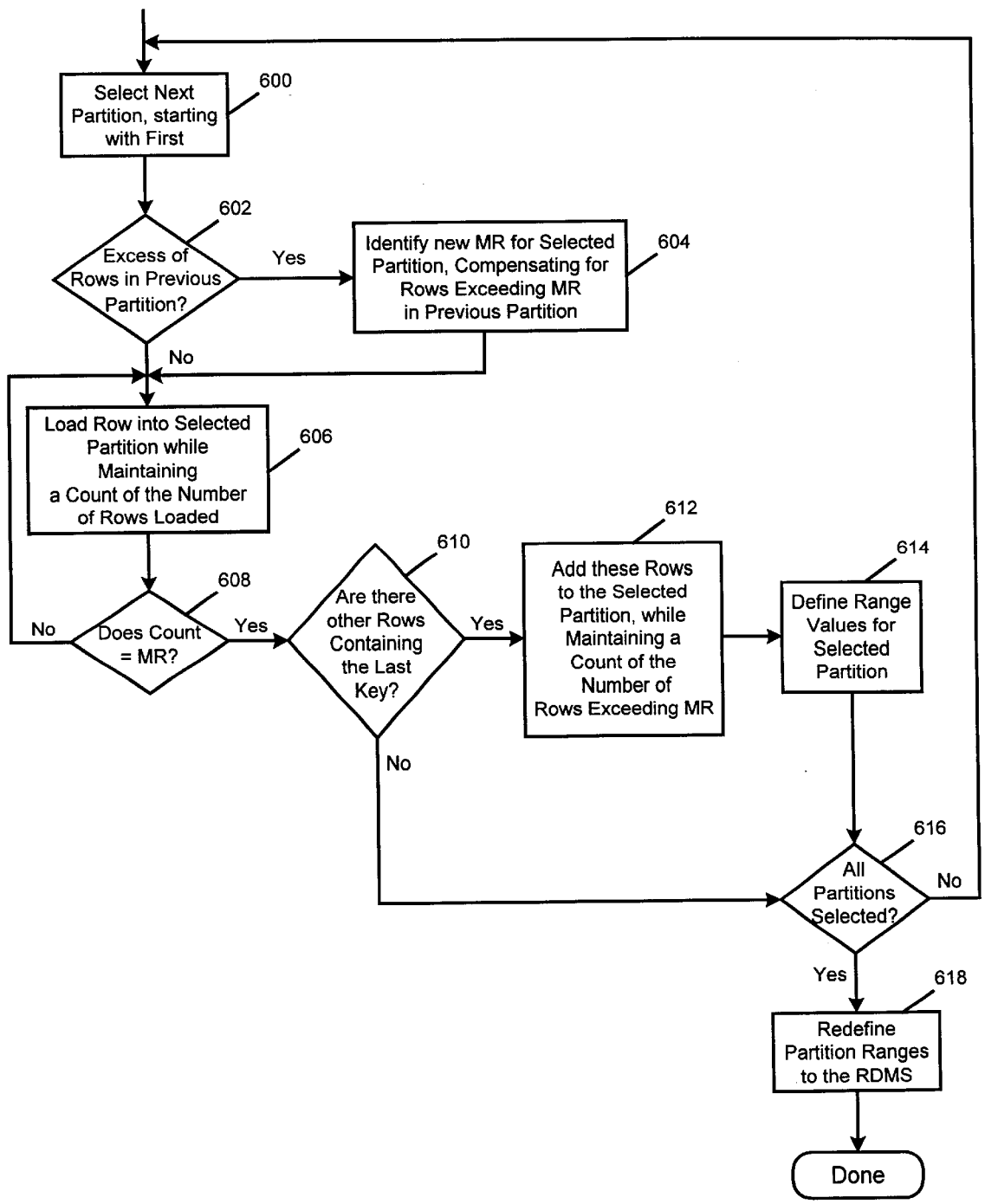
FIG. 6 is a flow diagram illustrating the steps performed by the rebalancing system to reload data into the partitions of a database.

FIG. 6 is a flow diagram illustrating the steps performed by the rebalancing system 124 to reload data into the partitions of a database object. In Block 600, the rebalancing system 124 selects the next partition, starting with the first. In Block 602, the rebalancing system 124 determines whether excess records were added to the previous partition (i.e., records exceeding the MR limit). If excess records were added, the rebalancing system 124 continues to Block 604, otherwise, the rebalancing system 124 continues to Block 606. In Block 604, the rebalancing system 124 identifies a MR for the selected partition, compensating for records exceeding the MR in the previously selected partition. In Block 606, the rebalancing system 124 loads a record into the selected partition while maintaining a count of the number of records loaded. In Block 608, the rebalancing system 124 determines whether the count of the number of records loaded exceeds the identified MR. If the count exceeds the identified MR, then the rebalancing system 124 continues to Block 610, otherwise, the rebalancing system 124 loops back to Block 606 to load another record.

In Block 610, the rebalancing system 124 determines whether there are other records containing the key of the last loaded record. If there are other records, the rebalancing system 124 continues to Block 612, otherwise, the rebalancing system 124 continues to Block 616. In Block 612, the rebalancing system 124 adds these records to the selected partition, while maintaining a count of the number of records exceeding the MR. In Block 614, the rebalancing system 124 defines range values for the selected partition. In Block 616, the rebalancing system 124 determines whether all partitions have been selected. If all partitions have been selected, the rebalancing system 124 continues to Block 618, otherwise, the rebalancing system 124 continues to Block 600 to select the next partition. In Block 618, the rebalancing system 124 redefines the partition ranges to the RDBMS.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented rebalancing system. The present invention provides an automated technique for rebalancing partitioned data. The present invention also rebalances partitioned data while compensating between partitions for excess records in one or more partitions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of rebalancing partitioned data in a database stored on a data storage device connected to a computer, the method comprising the steps of:
   redefining a number of partitions, wherein a number of partitions to be defined is received from user input;
   determining an optimal maximum number of data records to be reloaded in each partition, wherein a high range value comprises a range value of the data record that meets the optimal maximum number when added to the partition;
   reloading data records to each partition until the optimal maximum number is reached and until all data records having the high range value for the partition have been reloaded to that partition; and
   compensating for any records reloaded in any partition that exceed the optimal maximum number of data records in one partition.

2. The method of claim 1, wherein, if a number of partitions to be defined is not received, further comprising the step of using a current number of partitions.

3. The method of claim 1, further comprising the step of unloading data records while maintaining a count of the data records.

4. The method of claim 3, further comprising the step of using a partitioning index on a range value.

5. The method of claim 3, further comprising the steps of:
   scanning the data records without using an index; and
   sorting the scanned data records on a range value.

6. The method of claim 3, further comprising the step of identifying the optimal maximum number of data records by dividing the number of data records by the defined number of partitions.

7. The method of claim 6, further comprising the step of compensating for desired freespace.

8. The method of claim 1, further comprising the step of redefining the number of partitions without the range values.

9. The method of claim 1, further comprising the steps of:
   reordering the data records into the redefined ranges for the partitions; and
   reloading the data records.

10. The method of claim 9, further comprising the step of reloading the data records based on the desired freespace.

11. The method of claim 1, further comprising the steps of:
   for each partition,
      reloading the data records into a partition, keeping track of the number of data records loaded;
      when the optimal maximum number is reached, loading the data records with the same range value until a new range value is received; and
      defining a range value for the next partition.

12. The method of claim 11, wherein compensating further comprises the steps of:
   determining the number of data records loaded into the partition that exceed the optimal maximum number; and
   compensating for the exceeding data records in subsequent partitions.

13. The method of claim 11 further comprising the step of looking ahead by a number of data records to determine a more optimally balanced object.

14. An apparatus for rebalancing partitioned data, comprising:
   a computer having a data storage device connected thereto, wherein the data storage device stores a database containing the partitioned data;
   one or more programs, performed by the computer, for redefining a number of partitions, wherein a number of partitions to be defined is received from user input, determining an optimal maximum number of data records to be reloaded in each partition, wherein a high range value comprises a range value of the data record that meets the optimal maximum number when added to the partition, reloading data records to each partition until the optimal maximum number is reached and until all data records having the high range value for the partition have been reloaded to that partition, and compensating for any records reloaded in any partition that exceed the optimal maximum number of data records in one partition.

15. The apparatus of claim 14, wherein, if a number of partitions to be defined is not received, further comprising the step of using a current number of partitions.

16. The apparatus of claim 14, further comprising the means for unloading data records while maintaining a count of the data records.

17. The apparatus of claim 16, further comprising the means for using a partitioning index on a range value.

18. The apparatus of claim 16, further comprising:
means for scanning the data records without using an index; and
means for sorting the scanned data records on a range value.

19. The apparatus of claim 16, further comprising the means for identifying the optimal maximum number of data records by dividing the number of data records by the defined number of partitions.

20. The apparatus of claim 19, further comprising the means for compensating for desired freespace.

21. The apparatus of claim 14, further comprising the means for redefining the number of partitions without the range values.

22. The apparatus of claim 14, further comprising:
means for reordering the data records into the redefined ranges for the partitions: and
means for reloading the data records.

23. The apparatus of claim 22, further comprising the means for reloading the data records based on the desired freespace.

24. The apparatus of claim 14, further comprising:
for each partition,
means for reloading the data records into a partition, keeping track of the number of data records loaded;
means for, when the optimal maximum number is reached, loading the data records with the same range value until a new range value is received; and
means for defining a range value for the next partition.

25. The apparatus of claim 24, wherein compensating further comprises:
means for determining the number of data records loaded into the partition that exceed the optimal maximum number; and
means for compensating for the exceeding data records in subsequent partitions.

26. The apparatus of claim 24, further comprising the means for looking ahead by a number of data records to determine a more optimally balanced object.

27. An article of manufacture comprising a computer program carrier readable by computer and embodying one or more instructions executable by the computer to perform method steps for rebalancing partitioned data in a database stored in a data storage device connected to the computer, the method comprising the steps of:
redefining a number if partitions, wherein a number of partitions to be defined is received from user input;
determining an optimal maximum number of data records to be reloaded in each partition, wherein a high range value comprises a range value of the data records that meets the optimal maximum number when added to the partition;
reloading data records to each partition until the optimal maximum number is reached and until all data records having the high range value for the partition have been reloaded to that partition; and
compensating for any records reloaded in any partition that exceed the optimal maximum number of data records in one position.

28. The method of claim 27, wherein, if a number of partitions to be defined is not received, further comprising the step of using a current number of partitions.

29. The article of manufacture of claim 27, further comprising the step of unloading data records while maintaining a count of the data records.

30. The article of manufacture of claim 29, further comprising the step of using a partitioning index on a range value.

31. The article of manufacture of claim 29, further comprising the steps of:
scanning the data records without using an index; and
sorting the scanned data records on a range value.

32. The article of manufacture of claim 29, further comprising the step of identifying the optimal maximum number of data records by dividing the number of data records by the defined number of partitions.

33. The article of manufacture of claim 32, further comprising the step of compensating for desired freespace.

34. The article of manufacture of claim 27, further comprising the step of redefining the number of partitions without the range values.

35. The article of manufacture of claim 1, further comprising the steps of:
reordering the data records into the redefined ranges for the partitions; and
reloading the data records.

36. The article of manufacture of claim 35, further comprising the step of reloading the data records based on the desired freespace.

37. The article of manufacture of claim 27, further comprising the steps of:
for each partition,
reloading the data records into a partition, keeping track of the number of data records loaded;
when the optimal maximum number is reached, loading the data records with the same range value until a new range value is received; and
defining a range value for the next partition.

38. The article of manufacture of claim 37, wherein compensating further comprises the steps of:
determining the number of data records loaded into the partition that exceed the optimal maximum number; and
compensating for the exceeding data records in subsequent partitions.

39. The article of manufacture of claim 37, further comprising the step of looking ahead by a number of data records to determine a more optimally balanced object.

* * * * *